United States Patent
Koyama

[15] 3,662,438
[45] May 16, 1972

[54] APPARATUS FOR PRODUCING A MOLDED ARTICLE WITH A RECESS THEREIN

[72] Inventor: Magame Koyama, Yokohama, Japan

[73] Assignee: Columbia Machine, Inc., Vancouver, Wales

[22] Filed: Feb. 20, 1970

[21] Appl. No.: 12,915

[52] U.S. Cl. .............................................. 425/186, 264/334
[51] Int. Cl. ........................................ B28b 7/18, B28b 3/00
[58] Field of Search ................... 25/41 G, 41 R, 41 D, 41 L, 25/100, DIG. 17, DIG. 18; 249/175, 176, 177; 264/334, 39

[56] References Cited

UNITED STATES PATENTS

| 1,977,374 | 10/1934 | Brooke et al. | 25/100 X |
| 2,005,200 | 6/1935 | Gorman | 25/41 G |
| 1,429,459 | 9/1922 | Schol | 25/45 |

FOREIGN PATENTS OR APPLICATIONS

| 1,044,700 | 1958 | Germany | 25/41 G |
| 1,038,472 | 1958 | Germany | 25/DIG. 18 |

Primary Examiner—J. Spencer Overholser
Assistant Examiner—David S. Safran
Attorney—Kolisch & Hartwell

[57] ABSTRACT

Apparatus for producing a molded article with a recess therein including an elongated tapered core which is mounted for limited axial shifting relative to parts which form sides of a mold. The core is adapted to be shifted between one position which it occupies during molding of an article, and another (partially retracted) position wherein it is free from an article in the mold. Movement of a pallet to a position forming one of the sides of the mold shifts the core toward the first position mentioned. A ram carrying an element which is releasably engageable from the core may be operated to shift the core toward the other position.

7 Claims, 5 Drawing Figures

MAGAME KOYAMA
INVENTOR.
BY Kolisch & Hartwell
ATTY.

MAGAME KOYAMA
INVENTOR.

BY Kolisch & Hartwell
ATTY.

APPARATUS FOR PRODUCING A MOLDED ARTICLE WITH A RECESS THEREIN

This invention relates to apparatus for producing a molded article with a recess therein.

In the manufacture of a molded article it is often desirable to form a recess, or opening, therein which extends inwardly from a side thereof. This is generally accomplished by introducing moldable material in a plastic state into a mold and around a core in the shape of a desired recess which is positioned in the mold.

When such articles are manufactured on a continuing basis, in automatic or semiautomatic machinery, the mold and core are reused for producing successive articles. Generally, in the past, after an article had been formed in the mold and around the core, the core had to be withdrawn completely from the mold before the article could be removed to another area.

A general object of this invention is to provide novel apparatus for producing a molded article with a recess therein, wherein the core for forming the recess need not be completely withdrawn from the mold prior to removing the article to another area. This provides for rapid and efficient production.

More specifically, an object is to provide such apparatus in which the core tapers progressing axially therealong from one of its ends towards its other, or smaller, end. The core is movable between a molding position extending into the mold with a major portion of the core positioned in the mold, and a partially retracted position in which it is shifted axially toward its one end from its molded position, with the smaller end portion of the core maintained within the mold. Due to the taper of the core, such shifting and partial retraction breaks any adhesion between the core and the article, freeing the article for movement away from the core. The mold may be opened in the direction of the smaller end of the core and the article may be moved axially of the core in such direction away from the core and mold.

Still a further object of the invention is to provide apparatus of the type generally described, wherein movement of an article on a pallet away from mold area is effective to shift the core from its retracted to its molding position to form another article.

According to an embodiment of the invention, means is provided for moving a pallet in one direction axially of and adjacent one side of the core to a position wherein it forms one side of the mold and also in said direction away from the core to remove molded articles from the apparatus. Another object of the invention is to provide such apparatus in which a pallet on being moved in such direction frictionally engages the core and shifts it from its retracted to its molding position.

These and other objects and advantages will become more fully apparent as the following description is read in conjunction with the drawings, wherein.

Figure 1:
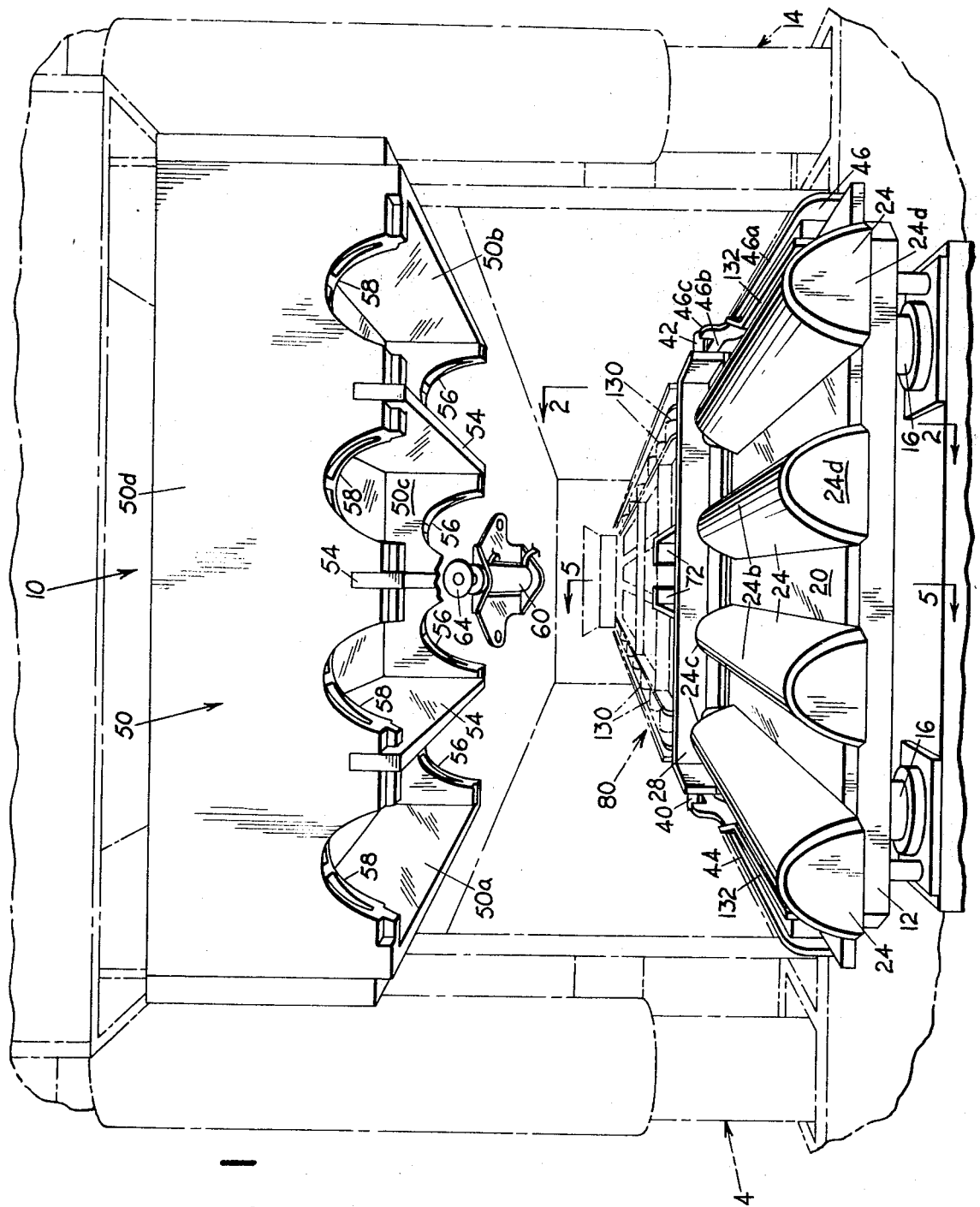
FIG. 1 is a perspective end view of apparatus constructed in accordance with an embodiment of the invention.

Referring now to the drawings and first more specifically to FIG. 1, at 10 is indicated generally apparatus constructed according to the invention. The specific apparatus illustrated is for use in producing concrete blocks having a recess extending along one side thereof.

The apparatus includes a pallet support table 12 mounted for vertical movement on a support frame indicated generally at 14. More specifically, table 12 is supported on the rod ends of a plurality of upright rams 16 suitably mounted on the frame. Coordinated extension of rams 16, through the operation of suitable fluid control means (not shown), raises the table from the position shown in FIGS. 1 and 5, which might be thought of as a lowered position toward a raised position, such as that shown illustrated in FIG. 2. Retraction of the rams lowers the table.

The upper side of table 12 occupies a substantially horizontal plane and provides support for the underside of a flat pallet, such as that indicated generally at 20 in the figures.

Figure 3:
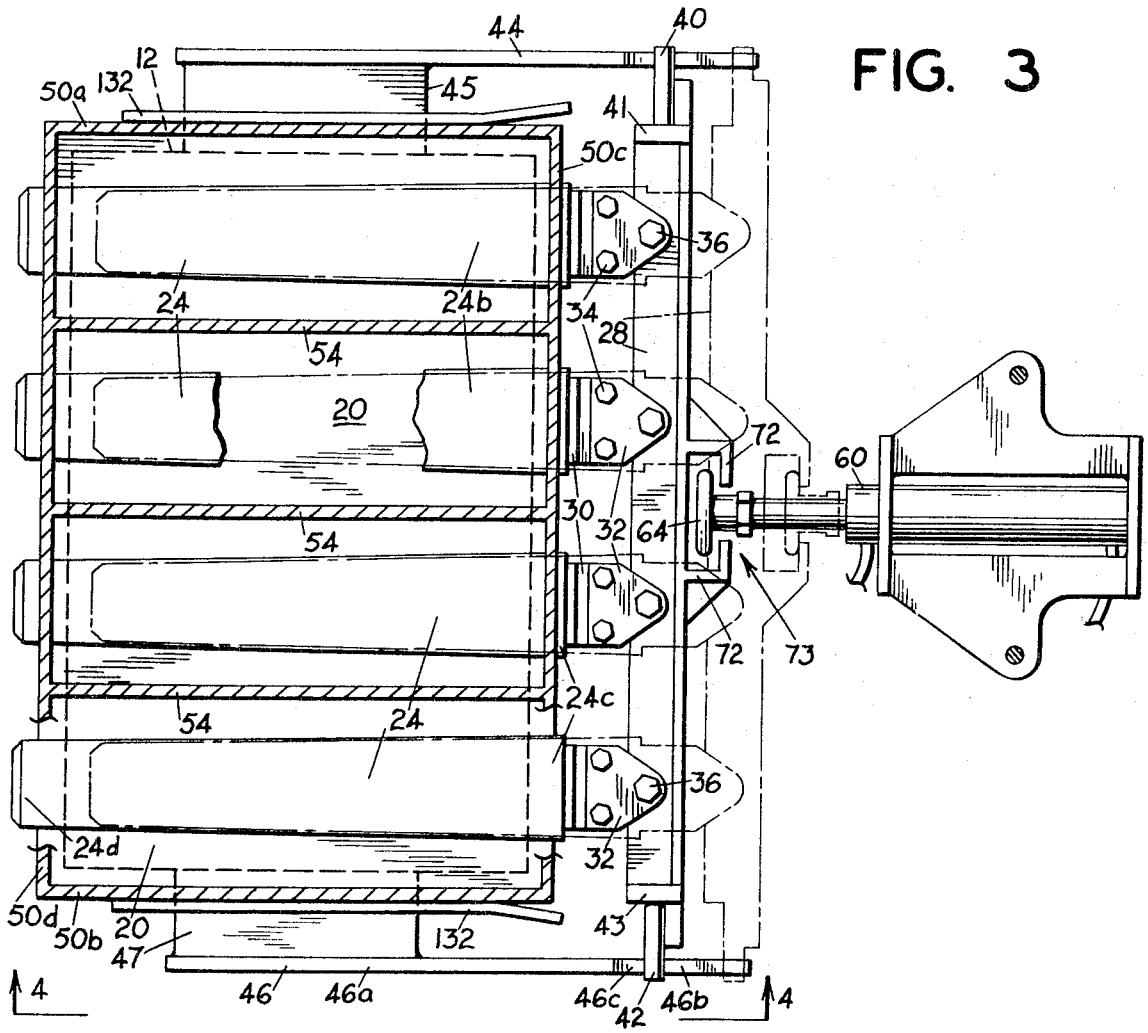
FIG. 3 is a view taken generally along the line 3—3 in FIG. 2.
Figure 2:
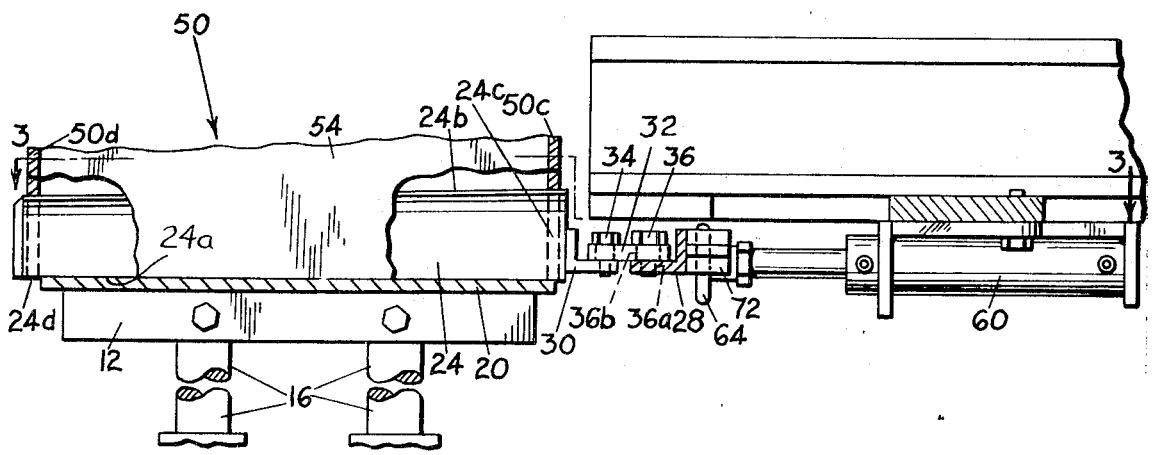
FIG. 2 is a side view, partially in cross section, taken generally along the line 2—2 in FIG. 1 with certain parts in the apparatus in different positions from those shown in FIG. 1.

A series of elongated, substantially parallel cores 24 are mounted, as will be more fully described, above the table, as is best seen in FIGS. 1, 2, and 3. The cores are shaped to produce the desired recesses in articles molded in the apparatus. In the embodiment illustrated the cores are similar in construction and thus, only one will be described in detail.

Each core is tapered between its ends, and has a substantially flat bottom 24a, and a curved top 24b. The large end of a core, designated 24c, is away from the viewer in FIG. 1, and on the right sides of FIGS. 2 and 3. The small end of a core, designated 24d, is toward the viewer in FIG. 1, and at the left in FIGS. 2 and 3.

The cores are connected at their large ends, 24c, to a horizontal flange of an elongated horizontal angle bar 28. The connections between the cores and angle bar 28 are similar, and thus only the connection for one core will be described in detail.

Referring specifically to FIGS. 2 and 3, a core is connected to the angle bar through an angle clip 30 secured to end 24c of the core and a link 32. A pair of bolts 34 extend through accommodating bores in link 32 and are screwed into threaded bores in a horizontal flange of angle clip 30. A shoulder bolt 36, having a threaded end portion 36a and an unthreaded intermediate portion 36b of larger diameter than portion 36a, extends through an accommodating bore in link 32 with portion 36a screwed into an accommodating threaded bore in angle bar 28. Portion 36b of the shoulder bolt is longer than the thickness of link 32, and the bore in link 32 through which portion 36b extends has a greater diameter than portion 36b. Link 32 thus is loosely mounted on bolt 36, with the link permitted to swing about an upright axis through bolt 36, and to shift a limited amount vertically and laterally.

A pair of elongated cylindrical bars 40, 42 (see FIGS. 3 and 4) are secured to and extend outwardly from plates 41, 43 joined to opposite ends of angle bar 28.

A pair of elongated rails 44, 46 are secured to opposite sides of table 12 through plates 45, 47, with such rails extending substantially parallel to one another and to cores 24. The rails are similar, and considering rail 46, it has an elongated forward portion 46a, nearest the viewer in FIG. 1 and at the left in FIGS. 3 and 4, which has an upper surface at approximately the same elevation as the top of table 12. The right hand portion of the rail as viewed in FIGS. 3 and 4 extends above the elevation of the table, and has a substantially horizontal support surface 46b defined thereon. A stop portion 46c projects above support surface 46b at the left of the support surface as illustrated in FIG. 4.

Figure 4:
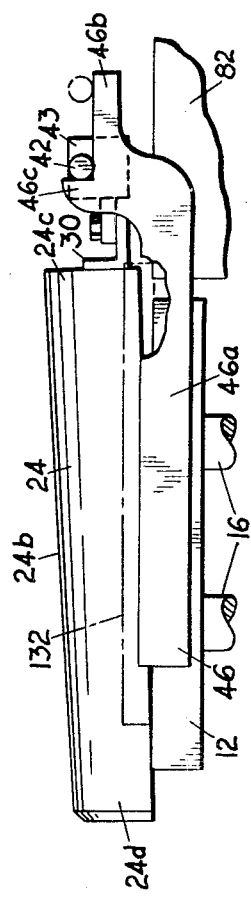
FIG. 4 is a view taken generally along the line 4—4 in FIG. 3.

Bars 40, 42 rest on the support surfaces of rails 44, 46, respectively, and serve to support angle bar 28, and ends 24c of the cores above the upper surface of table 12, as illustrated in FIG. 4. The smaller end of each core is biased by gravity downwardly toward table 12, and rests thereon in the absence of a pallet positioned on the table. With a pallet positioned on the table as in FIGS. 1 and 2, the cores are raised above the table, with their bottoms lying substantially flush with the top face of the pallet.

With the cores in the apparatus mounted as just described, it will be apparent that they are free to move in a number of different ways. More specifically, each core can wobble a certain amount relative to bar 28, and can rock up and down and side-to-side a certain amount, and can shift axially. Further, the cores and the bar connected to their large ends, move up and down with table 12. Axial shifting of all cores results from transverse shifting of bar 28, with sliding of bars 40, 42 back and forth on the support surfaces of the rails.

Axial shifting of the cores to the left in FIG. 3 is limited by engagement of bars 40, 42 with the stop portions on the rails. The cores are shown in FIG. 3 in solid outline shifted the maximum amount to the left. As will be more fully explained, the cores may be shifted a certain amount to the right in FIG. 3, to position them as shown in dash-dot outline.

Mounted on the frame above the table and cores is an assembly 50 which forms a portion of a mold for a group of blocks. Assembly 50 includes a pair of elongated, spaced, parallel sides 50a, 50b substantially paralleling cores 24, and a pair of elongated, spaced, substantially parallel ends 50c, 50d which extend between and are joined at their opposite set of ends to sides 50a, 50b. End 50c is referred to also herein as a mold part. Laterally spaced elongated spacer plates 54 extend between ends 50c, 50d parallel to sides 50a, 50b, dividing assembly 50 into four separate compartments. End 50c has a series of arcuate openings 56 each of which opens to an end of a different compartment in the assembly. End 50d has a series of arcuate openings 58 which are directly opposite and smaller than openings 56. Each of openings 56, 58 is directly above and adapted to fit over a core on table 12 with the table in its raised position.

A ram 60 is suitably secured to frame 14 adjacent assembly 50, to the right of the assembly in FIGS. 2 and 3, and at approximately the same elevation as this assembly. An enlarged head 64, also referred to herein as an element, is secured to the rod end of the ram. The ram is so secured to the frame that its rod end and head 64 may be shifted toward and away from assembly 50. Ram 60 is provided for shifting the cores in a direction to the right in FIG. 3.

Explaining further, secured to the right side of angle bar 28, as seen in FIGS. 2 and 3, are opposed, spaced, angle brackets 72 defining a socket indicated generally at 73 in FIG. 3. The brackets are positioned to receive head 64 with the ram extended and with the cores and support table raised (as shown in FIG. 2). With such the case, on contraction of ram 60 head 64 engages brackets 72 and draws angle bar 28 and cores 24 to their dot-dashed outline positions in FIG. 3.

In the apparatus shown herein, assembly 50 is adapted to form the top portion of a mold for a set of blocks, and a pallet such as pallet 20, when on table 12, is adapted to form the base of a mold.

Figure 5:
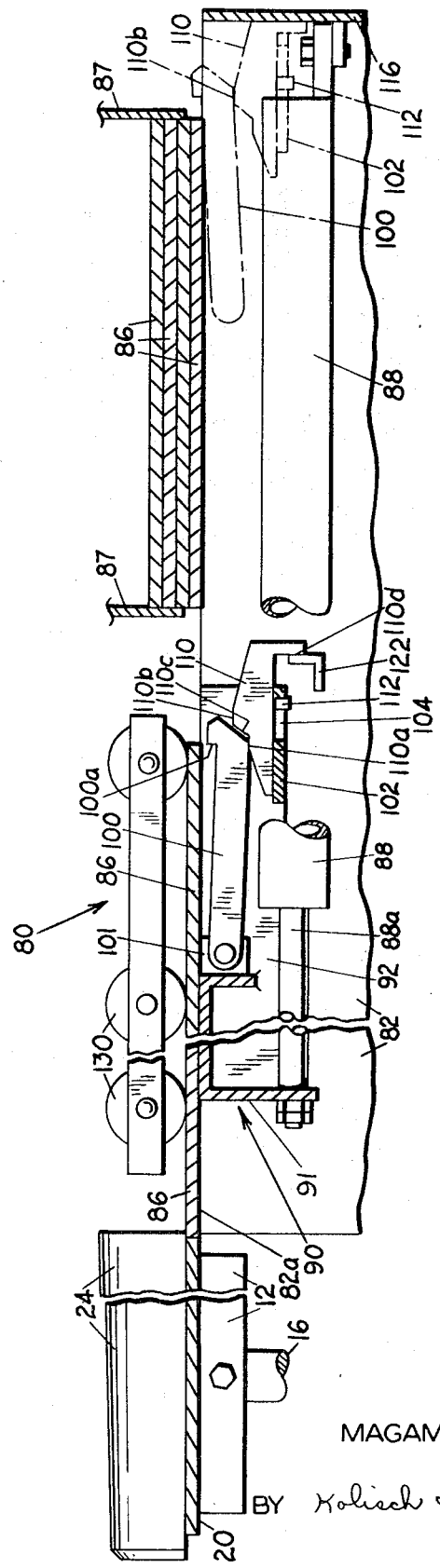
FIG. 5 is a view, reduced in scale and simplified, taken generally along the line 5—5 in FIG. 1, with portions broken away.

Apparatus for shifting a pallet to the proper position on table 12 beneath the cores is indicated generally at 80 in FIGS. 1 and 5. Apparatus 80 includes a pair of elongated, laterally spaced, substantially parallel side members, such as member 82, disposed with their longitudinal axes substantially paralleling the axes of the cores. The top faces of these side members, such as face 82a of member 82, occupy a common substantially longitudinal plane, and are adapted slidably to support opposite sides of a pallet. This plane is substantially coextensive with the plane of the top face of table 12 with the latter lowered. The side members are constructed to support the undersides of pallets, such as those indicated at 86, as they are moved one after the other, from a stack in a hopper 87, toward the left in FIG. 5.

Apparatus 80 also includes a horizontal, double-acting ram 88 supported between the side members with its rod end 88a projecting to the left in FIG. 5. Ram 88 extends substantially parallel to and is centered between the side members of the apparatus.

Secured to the outer end of rod 88a for movement integrally therewith is an elongated frame 90 which extends transversely of and between the side members. Frame 90 includes a cross member 91, joined to opposite ends of which are side plates, such as the one indicated generally at 92, extending adjacent and substantially parallel to members 82.

An elongated dog 100 extending substantially parallel to ram 88 is pivoted adjacent its left end in FIG. 5 to a bracket 101 anchored to cross member 91 adjacent side plate 92 for swinging about a substantially horizontal axis. Dog 100 has a pallet-engaging lip 100a thereon which projects upwardly adjacent the right end of the dog.

A support plate 102 is secured to the side plate 92 shown beneath the right end of dog 100 and projects horizontally inwardly toward ram 88. Plate 102 has an elongated slot 104 extending therethrough. The slot extends substantially parallel to ram 88.

A ramp member 110 rests loosely on support plate 102, and a pin 112 projecting downwardly therefrom is slidably received in slot 104. The ramp member on its upper side has a pair of vertically spaced substantially horizontal support surfaces 110a, 110b, with the latter above the former. A cam surface 110c slopes upwardly and to the right in FIG. 5 from surface 110a to surface 110b. The ramp member also has a leg 110d which projects downwardly from its right end in FIG. 5 to a region below pin 112.

Suitably interposed between member 110 and the adjacent side plate 92 is a conventional spring-biased toggle mechanism (concealed). This mechanism is effective to hold member 110 either in a position with pin 112 engaging the right end or engaging the left end of slot 104. With member 110 shifted from one of these positions toward the other, parts in the toggle mechanism move through an over-center position and urge the member toward the other position.

A similar dog, support plate and ramp member aligned transversely with those just described are similarly connected adjacent the opposite end of cross member 91.

Still referring to FIG. 5, the various parts in apparatus 80 illustrated in this figure are shown in solid outline in a condition with ram 88 extended. Ramp member 110 is positioned with pin 112 engaging the right end of slot 104. The right end of dog 100 rests on surface 110a with lip 100a below the plane containing the top surfaces of side members 82. Pallets are distributed in abutting relation along member 82, with one pallet on table 12 beneath the cores. Such pallet distribution results from previous operation of apparatus 80.

On contraction of ram 88, frame 90 and the various parts that it carries move to the right to positions such as those shown in dash-dot outline in FIG. 5. On such movement, ramp member 110 contacts a stop plate 116 extending transversely between members 82 and stops, with frame 90 and plate 102 shifting slightly further to the right as accommodated by slot 104. Dog 100 climbs up onto surface 110b of the ramp member, with lip 100a then projecting above the top surfaces of members 82.

On subsequent extension of ram 88, frame 90 shifts to the left with the dog raised. Lip 100a of the dog engages the right edge of the pallet at the base of the stack in the hopper and shifts it, and the other pallets on members 82, and on table 12, to the left. As a pallet is moved off table 12, a new pallet 86 is moved onto the table.

Further, with extension of ram 88 leg 110d of the ramp member engages a stop member 122 anchored to a side member 82, and the ramp member is prevented from moving further to the left. Continued extension of ram 88 moves carriage frame 90, dog 100, and support plate 102 further to the left and dog 100 drops to the position shown in solid outline in FIG. 5 and out of engagement with the edge of a pallet.

A series of weighted rollers 130, seen in FIGS. 1 and 5, are positioned adjacent side members 82 and rest against the upper surfaces of pallets on the members. The rollers hold the outer edges of the pallets against the upper surfaces of members 82 and in proper vertical alignment to move between cores 24 and table 12. Guide bars 132, best seen in FIGS. 1 and 3, secured to and projecting above the upper surface of table 12 adjacent opposite sides of the table serve to guide a pallet laterally onto the table.

Explaining now the operation of the apparatus, with table 12 lowered, and a pallet moved onto the table by operation of apparatus 80 as just described, the top face of the pallet frictionally and slidably engages the bottom faces 24a of the cores. Such action is effective to shift them axially to the left in FIGS. 2 and 3 to their solid outline positions in the figure, if the cores are not already so positioned. Rams 16 are extended to raise the table, pallet and cores with the cores then fitting snugly in openings 56, 58 in assembly 50, and with the pallet seating firmly against the base of this assembly. Concrete is then poured in a conventional manner into the top of assembly 50, over the pallet, and around the cores. The mold formed by assembly 50 and the pallet may be vibrated also in a conventional fashion. During such vibrating the loose connections provided herein between the cores and angle bar 28 allow the cores to vibrate properly with the mold.

With the table raised and ram 60 initially extended, it will be noted head 64 on this ram is received in socket 73. A suitable time after pouring of the concrete, and with the table still raised, ram 60 is retracted to shift cores 24 axially partially out of the mold (toward positions similar to those shown in dash-dot outline in FIG. 3). Due to the tapered configuration of the cores, this retraction serves to break any adhesion which may have developed between the concrete and the cores.

Rams 16 then are contracted to lower table 12, the pallet, the cores and newly molded blocks which it carries. Apparatus 80 is then operated to shift the pallet containing the blocks off the table, and to place an empty pallet on the table. The pallet carrying the blocks formed thereon moves off the table in a direction longitudinally of the cores, away from the small ends of the cores, and onto adjacent support means (not shown). As this occurs, frictional sliding engagement between the laden pallet and cores urges the latter to shift to the left in FIGS. 2, 3, and 5 to the positions which they had just prior to the molding operation described.

From the above it will be seen that apparatus is provided for forming molded articles with a recess therein in a rapid and efficient manner. The pallets which form the base of a mold in the apparatus progress in a line, and the cores do not have to be fully retracted from the mold each time an article is removed from the mold. Further, the pallets are moved in such manner that they frictionally engage the cores to move the cores into a proper molding position and a ram is provided for partially retracting the cores from the mold.

It should be obvious that the mold and cores may assume various shapes and sizes and that the cores may extend fully through the mold (as shown in this embodiment of the invention), or only partially therethrough if desired. It is only necessary that the cores taper from one end toward the other end, so that upon withdrawing them a short distance any adhesion between the core and molded article is broken.

While an embodiment of the invention has been illustrated, it should be obvious to those skilled in the art that variations and modifications are possible without departing from the spirit of the invention.

It is claimed and desired to secure by Letters Patent:

1. In apparatus using a pallet for producing a molded article with a recess therein comprising a mold part adapted to form one side of a mold for an article, said mold part having an opening extending through one of its ends, pallet support means for supporting a pallet substantially horizontally under said mold part, conveying means for conveying a pallet in one direction along a substantially horizontal path to said pallet support means, an elongated tapered core, means mounting said core in a substantially horizontal position above said pallet support means, said mounting means permitting limited axial shifting of the core in reverse directions along a substantially horizontal path paralleling the path of said pallet conveying means, said core having an undersurface which is so disposed relative to said conveying means that it is frictionally engaged by a pallet conveyed to said pallet support means with the core being urged by such a pallet to move in one of said reverse directions, means mounting said mold part, and said pallet supporting means and core for relative vertical movement toward and away from each other, whereby with such moved together a pallet supported by said support means forms another side of the mold for an article and the core extends through said opening in the mold part, and power-operated shifting means detachably connectable to said core operable selectively to shift the core in the direction opposite its said one direction.

2. The apparatus of claim 1, wherein said core is oriented with its small end adapted to extend through said opening with a mold partially bounded by said mold part.

3. The apparatus of claim 2, wherein shifting of the core in said one direction is in the direction from its large end toward its small end.

4. The apparatus of claim 1, wherein said power-operated shifting means is detachably connectable to said core, and is mounted in a substantially fixed position relative to said mold part.

5. The apparatus of claim 4 which further comprises means operatively connected to said core defining a socket, and wherein said shifting means comprises an element adapted releasably to be received in said socket with relative movement of said core and mold part toward one another.

6. The apparatus of claim 1, wherein said opening is disposed in a plane, and said core, under all circumstances extends across said plane.

7. The apparatus of claim 1, wherein said power-operated shifting means is mounted in a substantially fixed position relative to said mold part and includes means for operatively connecting the same to said core when the mold part and core are moved toward each other and for disconnecting the core therefrom when the mold part and core are moved apart.

* * * * *

UNITED STATES PATENT OFFICE
CERTIFICATE OF CORRECTION

Patent No. 3,662,438　　　　　　　　Dated May 16, 1972

Inventor(s) Magame Koyama

It is certified that error appears in the above-identified patent and that said Letters Patent are hereby corrected as shown below:

On the cover sheet [73], "Wales" should read

-- Wash. --.

Signed and sealed this 19th day of December 1972.

(SEAL)
Attest:

EDWARD M.FLETCHER,JR.　　　　　　　　ROBERT GOTTSCHALK
Attesting Officer　　　　　　　　　　Commissioner of Patents